(12) United States Patent
Kundalkar et al.

(10) Patent No.: US 12,166,558 B2
(45) Date of Patent: *Dec. 10, 2024

(54) SELECTIVE RADIO FREQUENCY (RF) REFERENCE BEAM RADIATION IN A WIRELESS COMMUNICATIONS SYSTEM (WCS) BASED ON USER EQUIPMENT (UE) LOCATIONS

(71) Applicant: Corning Research & Development Corporation, Corning, NY (US)

(72) Inventors: Siddhartha Dhananjaya Kundalkar, Lemon Grove, CA (US); Shirish Nagaraj, Pleasanton, CA (US); Farhan Aslam Qazi, San Diego, CA (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/218,736

(22) Filed: Jul. 6, 2023

(65) Prior Publication Data
US 2023/0361847 A1    Nov. 9, 2023

Related U.S. Application Data

(63) Continuation of application No. 17/535,186, filed on Nov. 24, 2021, now Pat. No. 11,728,875.
(Continued)

(51) Int. Cl.
*H04B 7/06* (2006.01)
*H04B 7/0426* (2017.01)
*H04B 7/08* (2006.01)

(52) U.S. Cl.
CPC .......... *H04B 7/0695* (2013.01); *H04B 7/043* (2013.01); *H04B 7/088* (2013.01)

(58) Field of Classification Search
CPC ....... H04B 7/0695; H04B 7/043; H04B 7/088
See application file for complete search history.

(56) References Cited

U.S. PATENT DOCUMENTS

| 6,504,636 B1 | 1/2003 | Seto et al. |
| 8,310,975 B2 | 11/2012 | Sundaresan et al. |

(Continued)

FOREIGN PATENT DOCUMENTS

WO    2017/008257 A1    1/2017

*Primary Examiner* — Kenneth T Lam
(74) *Attorney, Agent, or Firm* — William D. Doyle

(57) ABSTRACT

Selective radiation of radio frequency (RF) reference beams in a wireless communications system (WCS) based on user equipment (UE) locations is disclosed. The WCS may include a radio node that communicates RF communications signals in a coverage area via RF beamforming. Thus, the radio node is required to periodically radiate a number of RF reference beams in different directions of the coverage area to help UEs to identify a best-possible RF beam(s). However, radiating the RF beams in different directions periodically can increase power consumption of the radio node, particularly when the UEs are concentrated at a handful of locations in the coverage area. In this regard, the radio node can be configured to selectively radiate a subset of the RF reference beams based on a determined location(s) of the UE(s) in the coverage area, thus making it possible to reduce computational complexity and power consumption of the radio node.

19 Claims, 10 Drawing Sheets

Related U.S. Application Data

(60) Provisional application No. 63/118,433, filed on Nov. 25, 2020.

(56) References Cited

U.S. PATENT DOCUMENTS

| | | |
|---|---|---|
| 9,960,823 B2 | 5/2018 | Kim et al. |
| 11,728,875 B2 * | 8/2023 | Kundalkar ........... H04B 7/0695 |
| | | 375/262 |
| 2013/0059619 A1 | 3/2013 | Kim et al. |
| 2015/0334726 A1 | 11/2015 | Gao et al. |
| 2016/0360536 A1 | 12/2016 | Bae |
| 2017/0033904 A1 | 2/2017 | Stirling-Gallacher et al. |
| 2017/0214444 A1 | 7/2017 | Nigam et al. |
| 2019/0097712 A1 * | 3/2019 | Singh ................... H04B 7/0617 |
| 2019/0166527 A1 | 5/2019 | Oketani et al. |
| 2022/0095257 A1 | 3/2022 | Castaneda et al. |
| 2022/0149911 A1 | 5/2022 | Li et al. |
| 2022/0286867 A1 | 9/2022 | Siomina et al. |

* cited by examiner

SELECTIVE RADIO FREQUENCY (RF) REFERENCE BEAM RADIATION IN A WIRELESS COMMUNICATIONS SYSTEM (WCS) BASED ON USER EQUIPMENT (UE) LOCATIONS

CROSS-REFERENCE TO RELATED APPLICATIONS

This application is a continuation application of U.S. patent application Ser. No. 17/535,186, filed Nov. 24, 2021, which claims the benefit of priority under 35 U.S.C. § 119 of U.S. Provisional Application Ser. No. 63/118,433, filed Nov. 25, 2020, the content of each of which is relied upon and incorporated herein by reference in its entirety.

BACKGROUND

The disclosure relates generally to radiating a radio frequency (RF) reference beam(s) in a wireless communications system (WCS), such as a fifth-generation (5G) or a 5G new-radio (5G-NR) system and/or a distribute communications system (DCS).

Wireless communication is rapidly growing, with ever-increasing demands for high-speed mobile data communication. As an example, local area wireless services (e.g., so-called "wireless fidelity" or "WiFi" systems) and wide area wireless services are being deployed in many different types of areas (e.g., coffee shops, airports, libraries, etc.). Communications systems have been provided to transmit and/or distribute communications signals to wireless devices called "clients," "client devices," or "wireless client devices," which must reside within the wireless range or "cell coverage area" in order to communicate with an access point device. Example applications where communications systems can be used to provide or enhance coverage for wireless services include public safety, cellular telephony, wireless local access networks (LANs), location tracking, and medical telemetry inside buildings and over campuses. One approach to deploying a communications system involves the use of radio nodes/base stations that transmit communications signals distributed over physical communications medium remote units forming RF antenna coverage areas, also referred to as "antenna coverage areas." The remote units each contain or are configured to couple to one or more antennas configured to support the desired frequency(ies) of the radio nodes to provide the antenna coverage areas. Antenna coverage areas can have a radius in a range from a few meters up to twenty meters, as an example. Another example of a communications system includes radio nodes, such as base stations, that form cell radio access networks, wherein the radio nodes are configured to transmit communications signals wirelessly directly to client devices without being distributed through intermediate remote units.

For example, FIG. 1 is an example of a DCS 100 that includes a radio node 102 configured to support one or more service providers 104(1)-104(N) as signal sources (also known as "carriers" or "service operators"—e.g., mobile network operators (MNOs)) and wireless client devices 106(1)-106(W). For example, the radio node 102 may be a base station (eNodeB) that includes modem functionality and is configured to distribute communications signal streams 108(1)-108(S) to the wireless client devices 106(1)-106(W) based on downlink communications signals 110(1)-110(N) received from the service providers 104(1)-104(N). The communications signal streams 108(1)-108(S) of each respective service provider 104(1)-104(N) in their different spectrums are radiated through an antenna 112 to the wireless client devices 106(1)-106(W) in a communication range of the antenna 112. For example, the antenna 112 may be an antenna array. As another example, the radio node 102 in the DCS 100 in FIG. 1 can be a small cell radio access node ("small cell") that is configured to support the multiple service providers 104(1)-104(N) by distributing the communications signal streams 108(1)-108(S) for the multiple service providers 104(1)-104(N) based on respective downlink communications signals 110(1)-110(N) received from a respective evolved packet core (EPC) network $CN_1$-$CN_N$ of the service providers 104(1)-104(N) through interface connections. The radio node 102 includes radio circuits 118(1)-118(N) for each service provider 104(1)-104(N) that are configured to create multiple simultaneous signal beams ("beams") 120(1)-120(N) for the communications signal streams 108(1)-108(S) to serve multiple wireless client devices 106(1)-106(W). For example, the multiple beams 120(1)-120(N) may support multiple-input, multiple-output (MIMO) communications.

The radio node 102 of the DCS 100 in FIG. 1 may be configured to support service providers 104(1)-104(N) that have a different frequency spectrum and do not share the spectrum. Thus, in this instance, the downlink communications signals 110(1)-110(N) from the different service providers 104(1)-104(N) do not interfere with each other even if transmitted by the radio node 102 at the same time. The radio node 102 may also be configured as a shared spectrum communications system where the multiple service providers 104(1)-104(N) have a shared spectrum. In this regard, the capacity supported by the radio node 102 for the shared spectrum is split (i.e. shared) between the multiple service providers 104(1)-104(N) for providing services to the subscribers.

The radio node 102 in FIG. 1 can also be coupled to a DCS, such as a distributed antenna system (DAS), such that the radio circuits 118(1)-118(N) remotely distribute the downlink communications signals 110(1)-110(N) of the multiple service providers 104(1)-104(N) to remote units. The remote units can each include an antenna array that includes tens or even hundreds of antennas for concurrently radiating the downlink communications signals 110(1)-110(N) to subscribers using spatial multiplexing. Herein, the spatial multiplexing is a scheme that takes advantage of the differences in RF channels between transmitting and receiving antennas to provide multiple independent streams between the transmitting and receiving antennas, thus increasing throughput by sending data over parallel streams. Accordingly, the remote units can be said to radiate the downlink communications signals 110(1)-110(N) to subscribers based on a massive multiple-input multiple-output (M-MIMO) scheme.

No admission is made that any reference cited herein constitutes prior art. Applicant expressly reserves the right to challenge the accuracy and pertinency of any cited documents.

SUMMARY

Embodiments disclosed herein include selective radio frequency (RF) reference beam radiation in a wireless communications system (WCS) based on user equipment (UE) locations. In a non-limiting example, the WCS includes a radio node, such as a fifth-generation new radio (5G-NR) base station (gNoteB), configured to communicate RF communications signals with a number of UEs in a coverage area based on RF beamforming. Thus, the radio node is required to periodically radiate a number of RF reference beams (e.g., up to sixty-four) in different directions of the coverage area to help the UEs to identify a best-possible RF beam(s) for communication with the radio node. However, radiating the RF beams in different directions periodically can increase computational complexity and power consumption of the radio node, particularly when the UEs are concentrated at a handful of locations in the coverage area. In this regard, the radio node can be configured to selectively radiate a subset of the RF reference beams based on a determined location(s) of the UE(s) in the coverage area, thus making it possible to reduce computational complexity and power consumption of the radio node.

One exemplary embodiment of the disclosure relates to a WCS. The WCS includes a radio node coupled to an antenna array configured to radiate sequentially a plurality of RF reference beams in a plurality of directions in a coverage area. The radio node includes a control circuit. The control circuit is configured to receive an indication signal comprising at least one location of at least one UE in the coverage area. The control circuit is also configured to determine one or more selected RF reference beams among the plurality of RF reference beams based on the at least one location of the at least one UE. The control circuit is also configured to cause the antenna array to radiate sequentially the one or more selected RF reference beams.

An additional exemplary embodiment of the disclosure relates to a method for supporting selective RF reference beam radiation in a WCS. The method includes receiving an indication signal comprising at least one location of at least one UE in a coverage area. The method also includes determining one or more selected RF reference beams among a plurality of RF reference beams based on the at least one location of the at least one UE. The method also includes radiating sequentially the one or more selected RF reference beams.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Embodiments disclosed herein include selective radio frequency (RF) reference beam radiation in a wireless communications system (WCS) based on user equipment (UE) locations. In a non-limiting example, the WCS includes a radio node, such as a fifth-generation new radio (5G-NR) base station (gNoteB), configured to communicate RF communications signals with a number of UEs in a coverage area based on RF beamforming. Thus, the radio node is required to periodically radiate a number of RF reference beams (e.g., up to sixty-four) in different directions of the coverage area to help the UEs to identify a best-possible RF beam(s) for communication with the radio node. However, radiating the RF beams in different directions periodically can increase computational complexity and power consumption of the radio node, particularly when the UEs are concentrated at a handful of locations in the coverage area. In this regard, the radio node can be configured to selectively radiate a subset of the RF reference beams based on a determined location(s) of the UE(s) in the coverage area, thus making it possible to reduce computational complexity and power consumption of the radio node.

Figure 1:
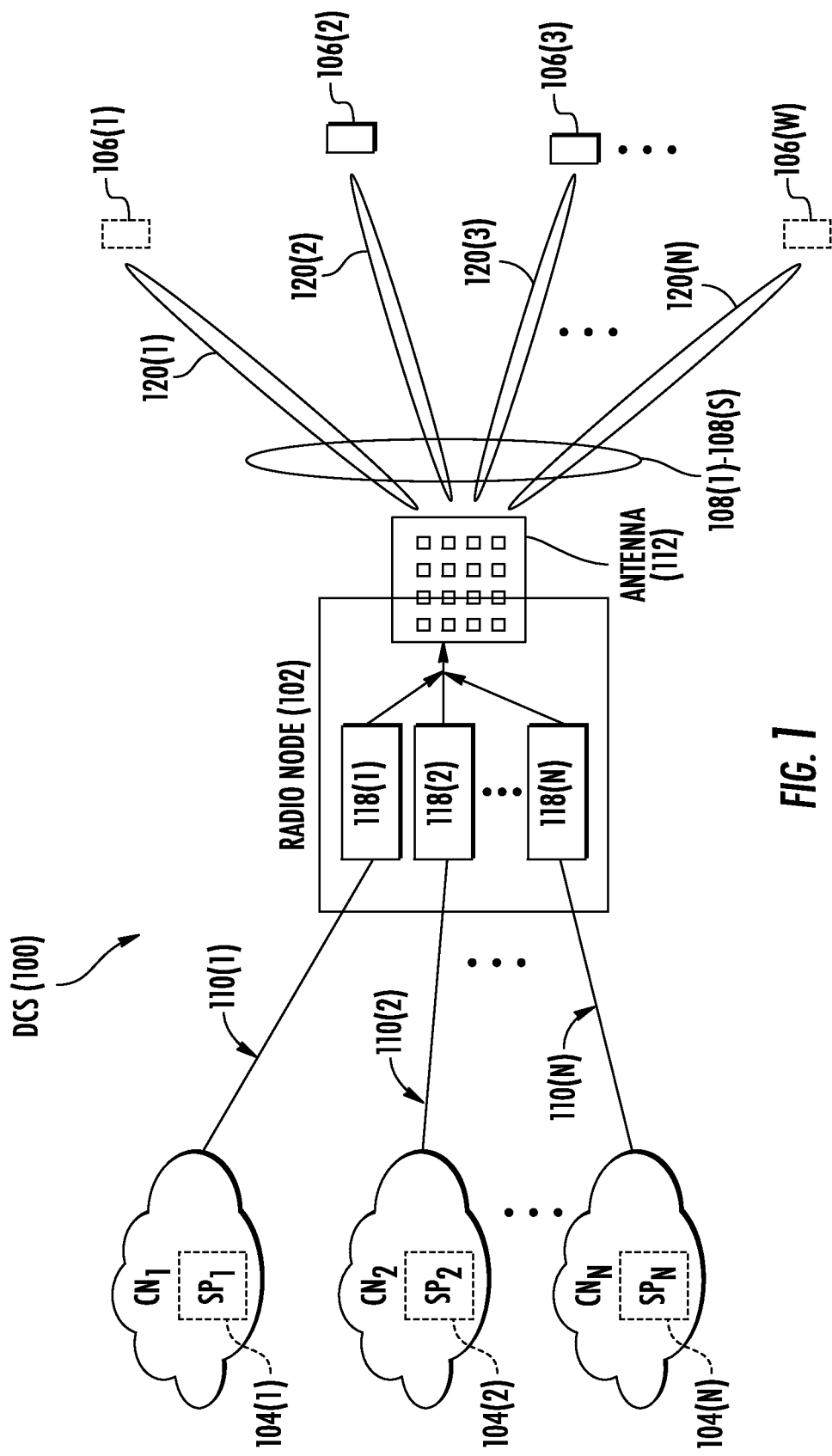
FIG. 1 is a schematic diagram of an exemplary wireless communications system (WCS), such as a distributed communications system (DCS), configured to distribute communications services to remote coverage areas.
Figure 2A:
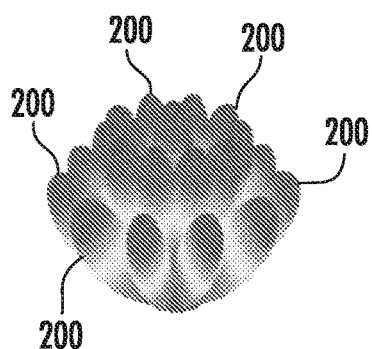
FIGS. 2A-2C are graphic diagrams providing exemplary illustration of a number of fundamental aspects related to radio frequency (RF) beamforming.
Figure 2B:
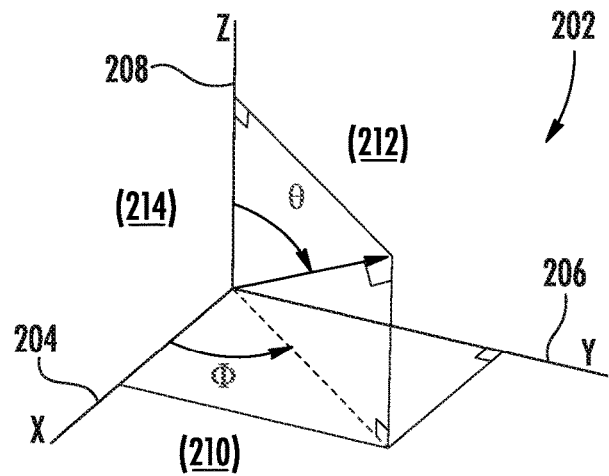
Figure 2C:
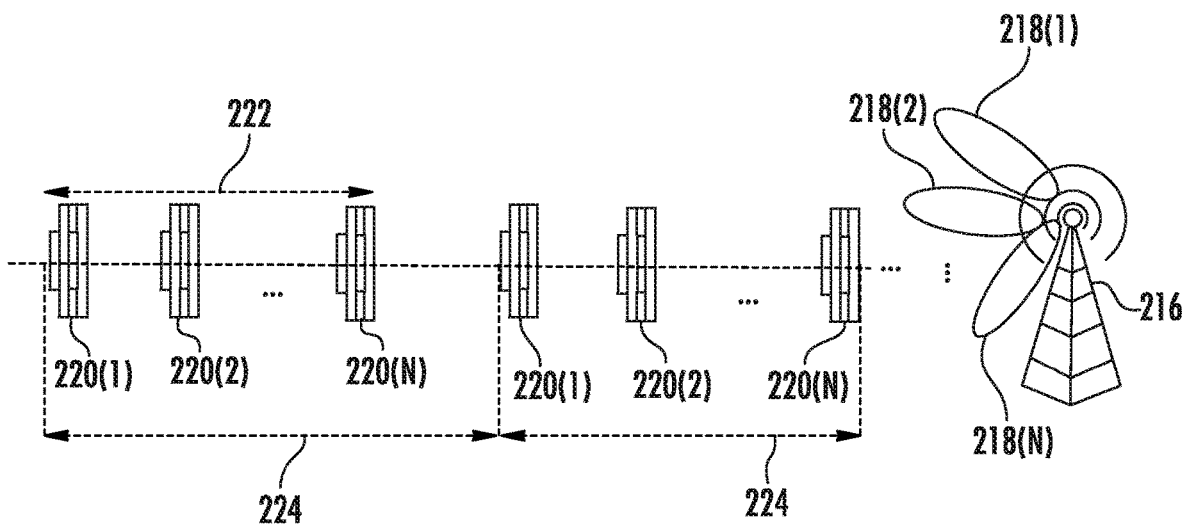
Figure 3:
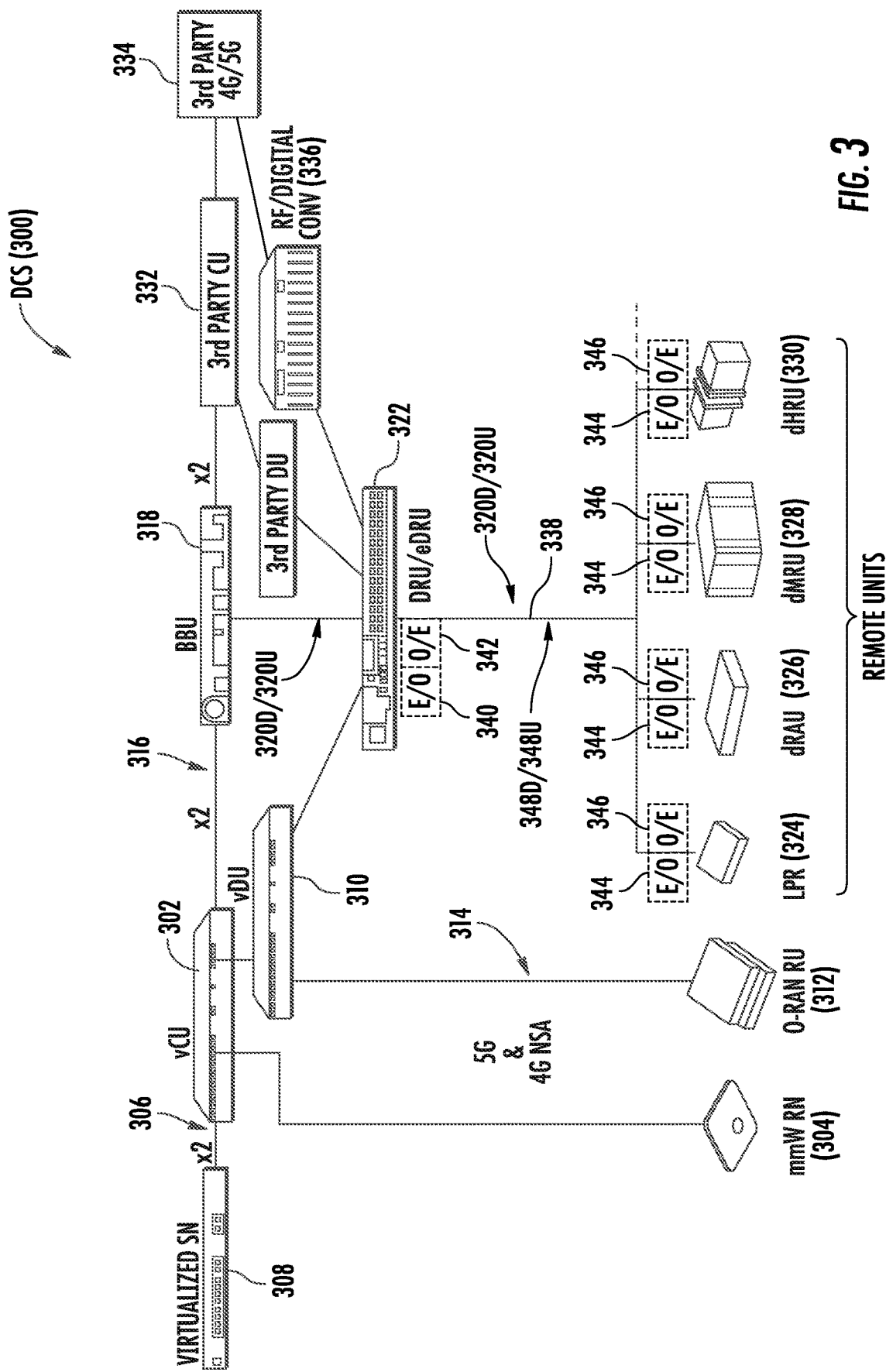
FIG. 3 is a schematic diagram of an exemplary DCS configured according to any of the embodiments disclosed herein to selectively radiate RF reference beam radiation based on user equipment (UE) locations.

Before discussing a WCS configured to support selective RF reference beam radiation based on UE locations to help reduce power consumption, starting at FIG. 3, a brief overview is first provided with reference to FIGS. 2A-2C to help explain some fundamental aspects related to RF beamforming.

In this regard, FIGS. 2A-2C are graphic diagrams providing exemplary illustration of a number of fundamental aspects related to RF beamforming. In general, beamforming refers to a technique that uses multiple antennas to simultaneously radiate an RF signal in an RF spectrum, such as a millimeter wave (mmWave) spectrum. The multiple antennas are typically organized into an antenna array (e.g., 4×4, 8×8, 16×16, etc.) and separated from each other by at least one-half (½) wavelength. The RF signal is pre-processed based on a beam weight set, which includes multiple beam weights corresponding to the multiple antennas, respectively, to generate multiple weighted RF signals. The multiple weighted RF signals are then fed to the multiple antennas, respectively, for simultaneous radiation in the RF spectrum. As illustrated in FIG. 2A, by pre-processing the RF signal based on multiple beam weight sets, it may be possible to form multiple RF beams 200 pointing to multiple directions, respectively.

Each beam weight in a given beam weight set is a complex weight consisting of a respective phase term and a respective amplitude term. The phase terms in the complex beam weight can be so determined to cause the multiple simultaneously radiated RF signals to constructively combine in one direction to form the RF beams 200, while destructively averaging out in other directions. In this regard, the phase term can determine how the RF beams 200 are formed and in which direction the RF beams 200 are pointing. On the other hand, the amplitude terms in the complex beam weight may determine how many of the antennas in the antenna array are utilized to simultaneously radiate the RF signals. Notably, when more antennas are utilized to simultaneously radiate the RF signals, the RF beams 200 will become more concentrated to have a narrower beamwidth and a higher beamformed antenna gain. In contrast, when fewer antennas are utilized to simultaneously radiate the RF signals, the RF beams 200 will become more spread out to have a wider beamwidth and a less beamformed antenna gain. In this regard, the amplitude term can determine the beamwidth of the RF beams 200.

FIG. 2B is a graphic diagram of an exemplary spherical coordinate system 202 that helps explain how the complex beam weight can be determined. The spherical coordinate system 202 includes an x-axis 204, a y-axis 206, and a z-axis 208. The x-axis 204 and the y-axis 206 collectively define an x-y plane 210, the y-axis 206 and the z-axis 208 collectively define a y-z plane 212, and the x-axis 204 and the z-axis 208 collectively define an x-z plane 214. Depending how the multiple antennas are arranged in the antenna array, a beam weight $w_n$ may be determined based on equations (Eq. 1-Eq. 4) below.

The equation (Eq. 1) below illustrates how a beam weight $w_n$ may be determined when the multiple antennas are arranged linearly along the y-axis 206.

$$w_n = e^{-j2\pi n \cdot \frac{dy}{\lambda} \cdot \sin\theta} (0 \leq n \leq N-1) \quad \text{(Eq. 1)}$$

In the equation (Eq. 1) above, N represents a total number of the antennas in the antenna array, and θ represents a zenith angle. The equation (Eq. 2) below illustrates how a beam weight $w_{m,n}$ may be determined when the multiple antennas are arranged in an M×N matrix in the x-y plane 210.

$$w_{m,n} = \quad \text{(Eq. 2)}$$
$$e^{-j2\pi m \cdot \frac{dx}{\lambda} \cdot \sin\theta\cos\phi} e^{-j2\pi n \cdot \frac{dy}{\lambda} \cdot \sin\theta\sin\phi} (0 \leq m \leq M-1, 0 \leq n \leq N-1)$$

In the equation (Eq. 2) above, M and N represent the number of rows and the number of columns of M×N matrix, respectively, and φ represents an azimuth angle. The equation (Eq. 3) below illustrates how the beam weight $w_{m,n}$ may be determined when the multiple antennas are arranged in an M×N matrix in the y-z plane 212.

$$w_{m,n} = e^{-j2\pi m \cdot \frac{dz}{\lambda} \cdot \cos\theta} e^{-j2\pi n \cdot \frac{dy}{\lambda} \cdot \sin\theta\sin\phi} (0 \leq m \leq M-1, 0 \leq n \leq N-1) \quad \text{(Eq. 3)}$$

The equation (Eq. 4) below illustrates how the beam weight $w_{m,n}$ may be determined when the multiple antennas are arranged in an M×N matrix in the x-z plane 214.

$$w_{m,n} = e^{-j2\pi m \cdot \frac{dx}{\lambda} \cdot \sin\theta\cos\phi} e^{-j2\pi n \cdot \frac{dz}{\lambda} \cdot \cos\theta} (0 \leq m \leq M-1, 0 \leq n \leq N-1) \quad \text{(Eq. 4)}$$

Notably, the equations (Eq. 1-Eq. 4) are non-limiting examples of a so-called "delay-and-sum" method for determining the beam weight $w_{m,n}$. It should be appreciated that the beam weight $w_{m,n}$ may also be determined based on other methods and/or algorithms. Although it may be possible for the antennas in the antenna array to form the multiple RF beams 200 in FIG. 2A in the multiple directions, an actual number of the RF beams 200 is typically limited by a standard-defined parameter known as the synchronization signal block (SSB). In this regard, FIG. 2C is a graphic diagram providing an exemplary illustration on how the SSB limits the actual number of the RF beams 200 that may be formed by the antennas in the antenna array.

In conventional wireless systems, such as the fourth-generation (4G) long-term evolution (LTE) wireless systems, a base station (a.k.a. eNodeB) is typically configured to radiate a cell-wide reference signal omnidirectionally to enable cell discovery and coverage measurement by a UE. However, a 5G-NR system does not provide the cell-wide reference signal. Instead, a 5G-NR base station 216 (a.k.a., gNodeB) is configured to radiate a number of RF reference beams 218(1)-218(N) in different directions of a 5G-NR coverage cell. The RF reference beams 218(1)-218(N) are associated with a number of SSBs 220(1)-220(N), respectively. Each of the SSBs 220(1)-220(N) may include a primary synchronization signal (PSS), a secondary synchronization signal (SSS), and a 5G-NR physical broadcast channel (PBCH).

In this regard, a 5G-NR UE in the 5G-NR coverage cell can sweep through the RF reference beams 218(1)-218(N) to identify a candidate RF reference beam(s) associated with a strongest reference signal received power (RSRP). Further, the 5G-NR UE may decode a candidate SSB(s) associated with the identified candidate RF reference beam(s) to acquire such information as physical cell identification (PCI) and a PBCH demodulation reference signal (DMRS). Based on the candidate RF reference beam(s) reported by the 5G-NR UE, the 5G-NR base station 216 may pinpoint a location of the 5G-NR UE and steer a data-bearing RF beam toward the 5G-NR UE to enable data communication with the 5G-NR UE.

The SSBs 220(1)-220(N) may be organized into an SSB burst set 222 to be repeated periodically in a number of SSB burst periods 224. The SSB burst set 222 may be five-milliseconds (5 ms) in duration, and the SSB burst periods 224 may repeat every twenty milliseconds (20 ms). The beamforming standard, as presently defined by the third-generation partnership project (3GPP), allows a maximum of 64 SSBs to be scheduled in the SSB burst set 222. Accordingly, the 5G-NR base station 216 can radiate up to 64 reference beams 218(1)-218(N) in each of the SSB burst periods 224.

Understandably, the 5G-NR base station 216 will be able to maximize coverage in the 5G-NR coverage cell by radiating the maximum number (e.g., 64) of the RF reference beams 218(1)-218(N) in each of the SSB burst periods 224. However, radiating the maximum number of the RF reference beams 218(1)-218(N) can introduce significant overhead in terms of computational complexity and power consumption. As such, it may be desirable to maximize coverage in the 5G-NR coverage cell by radiating as few of the RF reference beams 218(1)-218(N) as possible.

In this regard, FIG. 3 is a schematic diagram of an exemplary DCS 300 configured according to any of the embodiments disclosed herein to selectively radiate RF reference beams based on UE locations. The DCS 300 supports both legacy 4G LTE, 4G/5G non-standalone (NSA), and 5G standalone communications systems. As shown in FIG. 3, a centralized services node 302 is provided that is configured to interface with a core network to exchange communications data and distribute the communications data as radio signals to remote units. In this example, the centralized services node 302 is configured to support distributed communications services to an mmWave radio node 304. The functions of the centralized services node 302 can be virtualized through an x2 interface 306 to another services node 308. The centralized services node 302 can also include one or more internal radio nodes that are configured to be interfaced with a distribution node 310 to distribute communications signals for the radio nodes to an open random access network (O-RAN) remote unit 312 that is configured to be communicatively coupled through an O-RAN interface 314.

The centralized services node 302 can also be interfaced through an x2 interface 316 to a digital baseband unit (BBU) 318 that can provide a digital signal source to the centralized services node 302. The digital BBU 318 is configured to provide a signal source to the centralized services node 302 to provide downlink communications signals 320D to the O-RAN remote unit 312 as well as to a digital routing unit (DRU) 322 as part of a digital distributed antenna system (DAS). The DRU 322 is configured to split and distribute the downlink communications signals 320D to different types of remote units, including a low-power remote unit (LPR) 324, a radio antenna unit (dRAU) 326, a mid-power remote unit (dMRU) 328, and a high-power remote unit (dHRU) 330. The DRU 322 is also configured to combine uplink communications signals 320U received from the LPR 324, the dRAU 326, the dMRU 328, and the dHRU 330 and provide the combined uplink communications signals to the digital BBU 318. The digital BBU 318 is also configured to interface with a third-party central unit 332 and/or an analog source 334 through an RF/digital converter 336.

The DRU 322 may be coupled to the LPR 324, the dRAU 326, the dMRU 328, and the dHRU 330 via an optical fiber-based communications medium 338. In this regard, the DRU 322 can include a respective electrical-to-optical (E/O) converter 340 and a respective optical-to-electrical (O/E) converter 342. Likewise, each of the LPR 324, the dRAU 326, the dMRU 328, and the dHRU 330 can include a respective E/O converter 344 and a respective O/E converter 346.

The E/O converter 340 at the DRU 322 is configured to convert the downlink communications signals 320D into downlink optical communications signals 348D for distribution to the LPR 324, the dRAU 326, the dMRU 328, and the dHRU 330 via the optical fiber-based communications medium 338. The O/E converter 346 at each of the LPR 324, the dRAU 326, the dMRU 328, and the dHRU 330 is configured to convert the downlink optical communications signals 348D back to the downlink communications signals 320D. The E/O converter 344 at each of the LPR 324, the dRAU 326, the dMRU 328, and the dHRU 330 is configured to convert the uplink communications signals 320U into uplink optical communications signals 348U. The O/E converter 342 at the DRU 322 is configured to convert the uplink optical communications signals 348U back to the uplink communications signals 320U.

The mmWave radio node 304 may be a 5G-NR base station (a.k.a. gNodeB) that is functionally equivalent to the 5G-NR base station 216 in FIG. 2C. Like the 5G-NR base station 216, the mmWave radio node 304 can be configured according to the 3GPP standard to radiate up to 64 reference beams 218(1)-218(N) in each of the SSB burst periods 224.

However, the mmWave radio node 304 is different from the 5G-NR base station 216 in that the mmWave radio node 304 can be further configured according to embodiments disclosed herein to support selective RF reference beam radiation based on UE locations, thus helping to reduce power consumption at the mmWave radio node 304. Specifically, the mmWave radio node 304 may receive a location of a UE(s) in a coverage area of the mmWave radio node 304 and radiate a subset of the 64 reference beams 218(1)-218(N) toward the UE(s). The location of the UE(s) may be represented by a predetermined location index number, a pair of two-dimensional (2D) coordinates, a set of three-dimensional (3D) coordinates, a geo-location tag (e.g., Internet Protocol (IP) address), or a combination thereof. Accordingly, the mmWave radio node 304 can determine (e.g., from a preconfigured lookup table) the zenith angle $\theta$ and the azimuth angle $\phi$, as shown in the spherical coordinate system 202 of FIG. 2B, for steering the selected RF reference beams toward the UE(s). In addition, the mmWave radio node 304 may opportunistically stop radiating all RF reference beams when there is no UE in the coverage area and/or during a certain time (e.g., wee hours). As a result, it is possible to significantly reduce power consumption of the mmWave radio node 304.

Figure 4A:
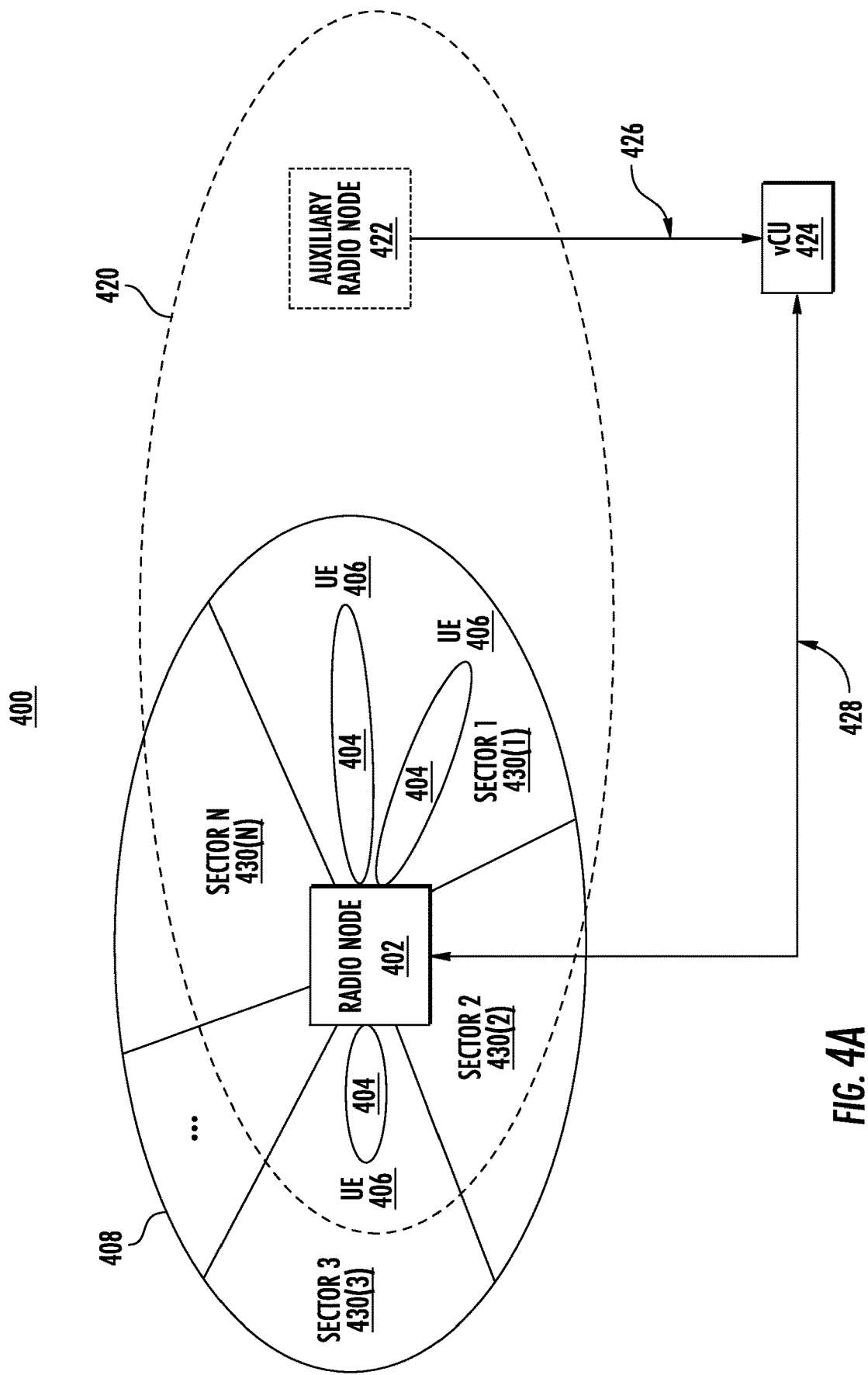
FIG. 4A is a schematic diagram of a WCS, such as the DCS of FIG. 3, including a radio node configured according to embodiments of the present disclosure to radiate one or more selected RF reference beams based on locations of one or more UEs located in a coverage area of the radio node.

FIG. 4A is a schematic diagram of a WCS 400, such as the DCS 300 of FIG. 3, including a radio node 402 configured according to embodiments of the present disclosure to radiate one or more selected RF reference beams 404 based on locations of one or more UEs 406 located in a coverage area 408 of the radio node 402. In a non-limiting example, the radio node 402 is a 5G NR base station (gNodeB) that is functionally identical to the mmWave radio node 304 in the DCS 300 of FIG. 3.

Figure 4B:
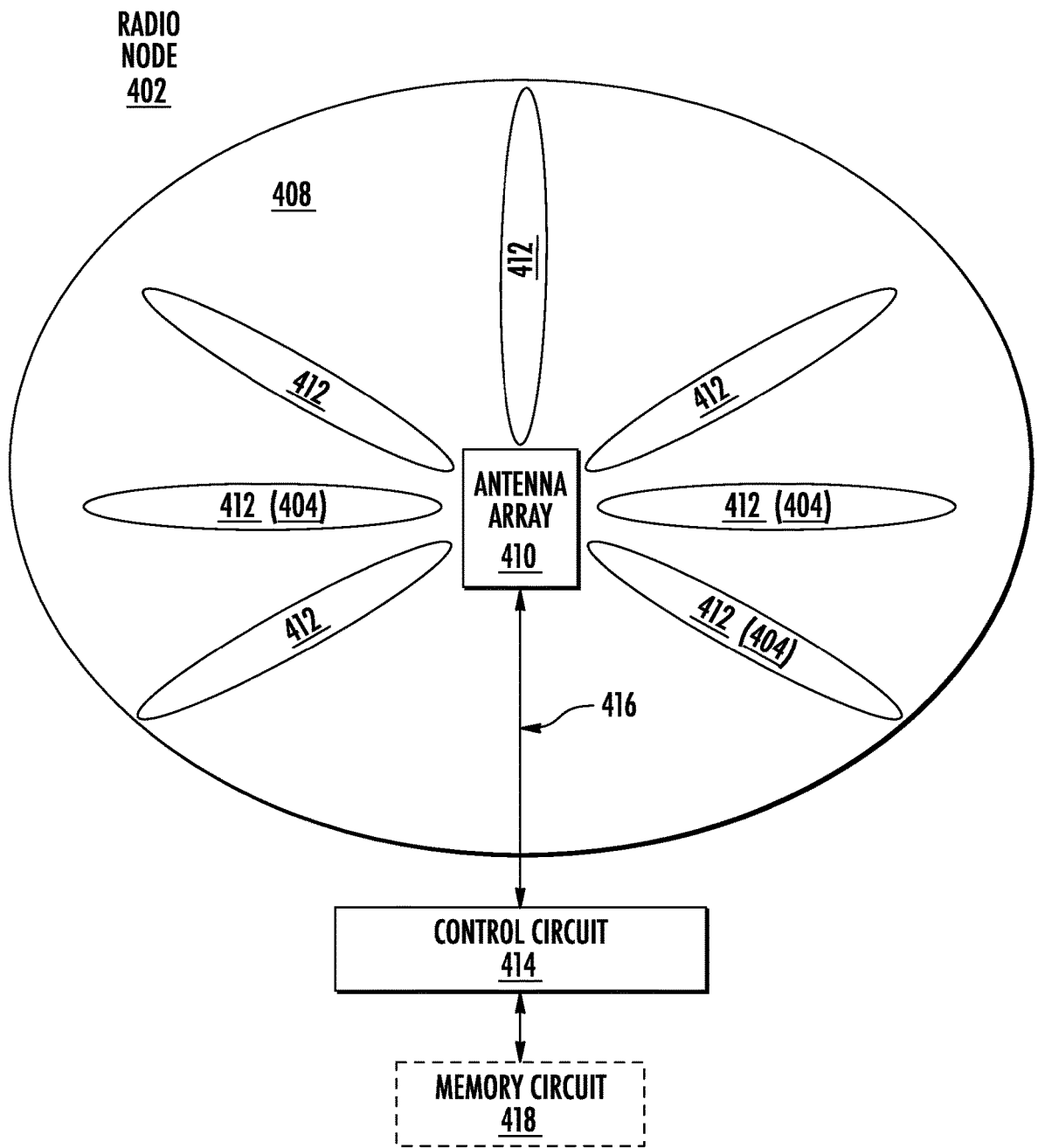
FIG. 4B is a schematic diagram providing an exemplary illustration of the radio node in FIG. 4A.

FIG. 4B is a schematic diagram providing an exemplary illustration of the radio node 402 of FIG. 4A. Common elements between FIGS. 4A and 4B are shown therein with common element numbers and will not be re-described herein. The radio node 402 may include or be coupled to an antenna array 410 having a large number of radiating elements. The antenna array 410 is configured to radiate sequentially a plurality of RF reference beams 412 in a plurality of directions, respectively, in the coverage area 408. Like the mmWave radio node 304 in FIG. 3, the radio node 402 can be configured according to the 3GPP standard to radiate up to 64 RF reference beams 412.

The radio node 402 includes a control circuit 414, which can be a signal processing circuit, a transceiver circuit, or a field-programmable gate array (FPGA), as an example. As discussed in detail below, the control circuit 414 is configured to cause the antenna array 410 to selectively radiate the selected RF reference beams 404 in FIG. 4A, which is a subset of the RF reference beams 412. According to previous discussions in FIG. 2B, the control circuit 414 can cause the antenna array 410 to radiate the selected RF reference beams 404 toward the UEs 406 by providing a beam control signal

416 that includes beam weight sets so determined based on the zenith angle θ and the azimuth angle φ. The control circuit 414 may determine the beam weight sets based on the "delay-and-sum" method as shown in the equations (Eq. 1-Eq. 4) and/or any other algorithms deemed appropriate.

The radio node 402 may include a memory circuit 418, which can be random access memory (RAM), read-only memory (ROM), flash memory, register, or any combination thereof. The memory circuit 418 may store a lookup table that correlates a location(s) of a UE(s) to the zenith angle θ and the azimuth angle φ. In this regard, the control circuit 414 can retrieve the zenith angle θ and the azimuth angle φ from the lookup table based on the location(s) of the UE(s) to help determine the beam weight sets in the beam control signal 416.

With reference back to FIG. 4A, like the DCS 300 in FIG. 3, the WCS 400 can be a 4G/5G NSA system. In this regard, the coverage area 408 of the radio node 402 can overlap (entirely or partially) with an auxiliary coverage area 420 anchored by an auxiliary radio node 422. In a non-limiting example, the auxiliary radio node 422 can be a 4G base station (eNodeB). The auxiliary radio node 422 may be collocated with non-3GPP radio devices, such as a Wi-Fi access point (AP), a Bluetooth device, and/or a global positioning system (GPS) device, that can assist in determining a geo-location(s) of the UEs 406.

In the 4G/5G NSA system, the auxiliary radio node 422 and the radio node 402 will coexist and operate concurrently. As previously described in FIG. 2C, the auxiliary radio node 422 is configured to radiate a cell-wide reference signal omnidirectionally in the auxiliary coverage area 420 such that the UEs 406 can perform cell discovery and coverage measurement when entering into the auxiliary coverage area 420. Accordingly, the UEs 406 will likely discover and thereby register with the auxiliary radio node 422 before discovering and registering with the radio node 402.

In this regard, when the UEs 406 register with the auxiliary radio node 422, the auxiliary radio node 422 will be able to obtain location and capability (e.g., 5G capability) information from the UEs 406. Concurrently or subsequently, the non-3GPP radio devices collocated with the auxiliary radio node 422 may also provide additional geo-location(s) of the UEs 406. The location and capability information obtained by the auxiliary radio node 422, in conjunction with the geo-location(s) provided by the non-3GPP radio devices, may in turn be used to determine the location(s) of the UEs 406 in the coverage area 408.

The WCS 400 can be configured to include a centralized service node 424 (denoted as "vCU"), which may be identical to the centralized services node 302 in FIG. 3. The centralized service node 424 is communicatively coupled to the radio node 402, the auxiliary radio node 422, and the non-3GPP radio devices collocated with the auxiliary radio node 422 if the non-3GPP radio devices are present.

The auxiliary radio node 422 may be configured to provide a location update 426, which includes the location and capability information, to the centralized service node 424 whenever the UEs 406 register with the auxiliary radio node 422 or change location in the auxiliary coverage area 420. In one embodiment, the location update 426 may optionally include the geo-location(s) obtained by the non-3GPP radio devices. Alternatively, the non-3GPP radio devices may send the geo-location(s) to the centralized service node 424 separately. The centralized service node 424 may provide an indication signal 428 to the radio node 402 to indicate the location and capability information of the UEs 406. In a non-limiting example, the centralized service node 424 can be configured to provide the indication signal 428 periodically (e.g., every 10 to 100 milliseconds) and/or in response to receive the location update from the auxiliary radio node 422. Accordingly, the radio node 402 can determine the selected RF reference beams 404 based on the location and capability information indicated in the indication signal 428.

The coverage area 408 may be pre-divided into a plurality of coverage sectors 430(1)-430(N). Each of the coverage sectors 430(1)-430(N) can be associated with one or more of the RF reference beams 412 that the radio node 402 can maximumly radiate in accordance to the 3GPP standard. In this regard, it is possible to map the location(s) of the UEs 406 to a selected coverage sector(s) among the coverage sectors 430(1)-430(N) and choose the RF reference beams associated with the selected coverage sector(s) as the selected RF reference beams 404.

For example, the UEs 406 are determined to be located in the coverage sectors 430(1) and 430(3). In this regard, the coverage sectors 430(1) and 430(3) are determined as the selected coverage areas and the RF reference beams associated with the selected coverage sectors 430(1) and 430(3) will be determined as the selected RF reference beams 404. Accordingly, the radio node 402 will radiate the selected RF reference beams 404 in the selected coverage sectors 430(1) and 430(3). In contrast, the radio node 402 will not radiate any of the RF reference beams 412 in those coverage sectors, such as coverage sector 430(2), without any UE, thus helping to reduce power consumption at the radio node 402.

The radio node 402 may be further configured not to radiate any of the RF reference beams 412 in any of the coverage sectors 430(1)-430(N) in case no UE is detected in any of the coverage sectors 430(1)-430(N) and/or during a certain time period (e.g., wee hours) of a day. In a non-limiting example, the radio node 402 can determine that no UE is located in any of the coverage sectors 430(1)-430(N) if the indication signal 428 does not include the location(s) of the UEs 406.

Notably, some of the UEs 406 may not have the capability to correctly receive and process the selected RF reference beams 404. In this regard, the radio node 402 may further determine whether the UEs 406 can receive and process the selected RF reference beams 404 based on the capability information received from the indication signal 428. Accordingly, the radio node 402 can refrain from radiating the selected RF reference beams 404 to any of the UEs 406 determined to be incapable of receiving and processing the selected RF reference beams 404. In a non-limiting example, the radio node 402 can determine whether the UEs 406 are capable of receiving and processing the selected RF reference beams 404 based on a capability indication received from the indication signal 428.

The UEs 406 may receive the selected RF reference beams 404 either directly (line-of-sight) or indirectly (non-line-of-sight). In some cases, a non-line-of-sight RF reference beam (e.g., reflected by a physical object), may even be stronger than a line-of-sight RF reference beam. In this regard, the radio node 402 may be further configured to instruct, via a radio resource control (RRC) signal for example, the UEs 406 to select a specific one of the selected RF reference beams 404. In a non-limiting example, the radio node 402 may determine the specific one of the selected RF reference beams 404 based on historical data and/or simulation data pertaining to the location(s) of the UEs 406.

Since the coverage area 408 and the auxiliary coverage area 420 may be partially overlapped, it is understandably possible that a UE can be located inside the coverage area 408 but outside the auxiliary coverage area 420. As a result, the UE may not be able to discover and register with the auxiliary radio node 422. In this regard, to help such UE to discover and register with the radio node 402, the radio node 402 may be configured to periodically radiate all of the RF reference beams 412 in all of the coverage sectors 430(1)-430(N) (also referred to as "a full reference beam sweep" hereinafter). To help conserve energy, the radio node 402 may perform the full reference beam sweep based on an extended interval (e.g., every 1 to 10 seconds). To help further conserve energy, the radio node 402 may be further configured to radiate each of the RF reference beams 412 during the full reference beam sweep with a wider beamwidth that a respective beamwidth used to radiate any of the selected RF reference beams 404.

Figure 5:
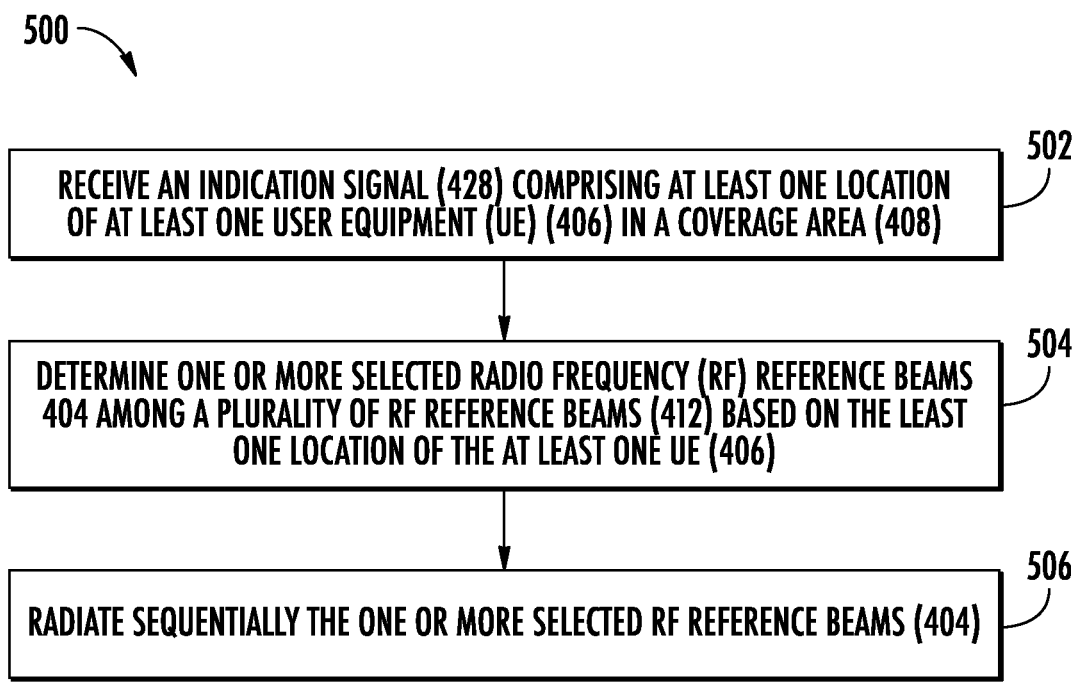
FIG. 5 is a flowchart of an exemplary process that may be employed by the radio node in FIGS. 4A and 4B to support selective radiation of RF reference beams based on UE locations.

The radio node 402 may be configured to selectively radiate the selected RF reference beams 404 based on the locations of the UEs 406 in accordance to a process. In this regard, FIG. 5 is a flowchart of an exemplary process 500 that may be employed by the radio node 402 in FIGS. 4A and 4B to support selective radiation of RF reference beams based on UE locations.

Specifically, the radio node 402 receives the indication signal 428 that includes the location(s) of the UEs 406 in the coverage area 408 (block 502). The radio node 402 then determines the selected RF reference beams 404 among the RF reference beams 412 based on the location(s) of the UEs 406 (block 504). Accordingly, the radio node 402 radiates the selected RF reference beams 404 (block 506).

With reference back to FIG. 4A, the centralized service node 424 can be configured to process the location and capability information and/or the geo-location(s) received in the location update 426 to determine the location(s) of the UEs 406 in the coverage area 408. The centralized service node 424 may employ, for example artificial intelligence (AI) algorithms, to determine the location(s) of the UEs 406 based on priori information (e.g., floor plan, location map, surrounding environment, historical data, etc.). In a non-limiting example, the centralized service node 424 generates the indication signal 428 to include the location(s) of the UE 406 if the location update 426 contains the location and configuration of the UEs 406. In contrast, the centralized service node 424 generates the indication signal 428 without the location(s) of the UE 406 if the location update 426 does not contain the location and configuration of the UEs 406.

To register with the auxiliary radio node 422, the UEs 406 need to exchange capability information with the auxiliary radio node 422. The capability information may indicate whether the UEs 406 are 5G-capable to support RF beam-forming. In this regard, the auxiliary radio node 422 may include a capability indication(s) in the location update 426 to indicate whether the UEs 406 are 5G-capable. The centralized service node 424 may include the capability indication in the indication signal 428 such that the radio node 402 can determine whether the UEs 406 can correctly receive and process the selected RF reference beams 404.

Figure 6:
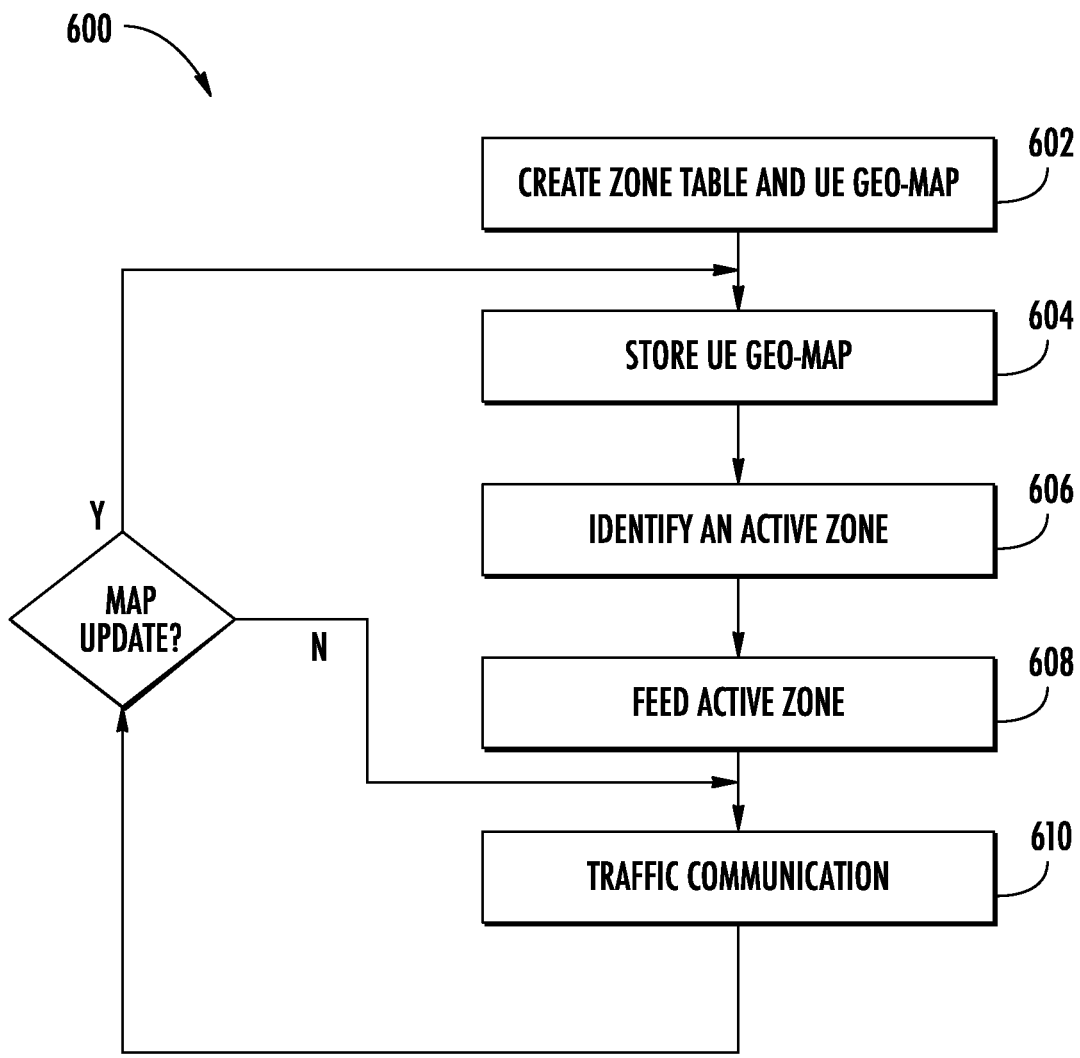
FIG. 6 is a flowchart of an exemplary process that may be employed to help enable selective RF reference beam radiation based on UE locations.

FIG. 6 is a flowchart of an exemplary process 600 that may be employed to help enable selective RF reference beam radiation based on UE locations. The process 600 includes creating zone table and UE geo-map (block 602). The process 600 also includes storing the UE geo-map (block 604). The process 600 also includes identifying an active zone (block 606). The process 600 also includes feeding the active zone (e.g., to the radio node 402) (block 608). The process also includes communicating traffic (e.g., between the radio node 402 and the UEs 406) (block 610). The process 600 may periodically check whether there is a need to update the geo-map. If so, the process 600 returns to block 604. Otherwise, the process 600 stays in block 610.

Figure 7:
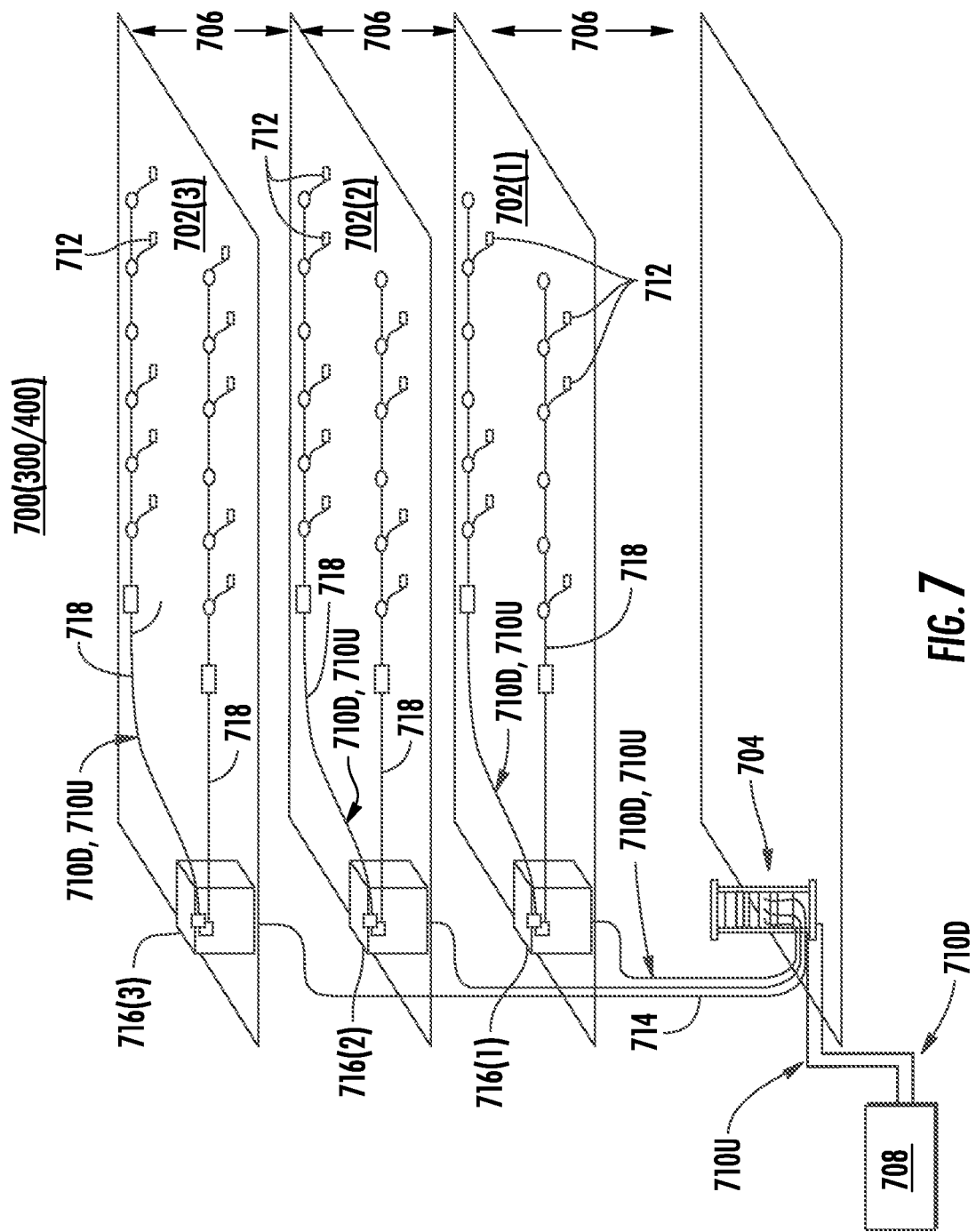
FIG. 7 is a partial schematic cut-away diagram of an exemplary building infrastructure in a WCS, such as the DCS of FIG. 3 and the WCS of FIG. 4A.

The DCS 300 of FIG. 3 and the WCS 400 in FIG. 4A can be provided in an indoor environment as illustrated in FIG. 7. FIG. 7 is a partial schematic cut-away diagram of an exemplary building infrastructure 700 in a WCS, such as the DCS 300 of FIG. 3 and the WCS 400 of FIG. 4A. The building infrastructure 700 in this embodiment includes a first (ground) floor 702(1), a second floor 702(2), and a third floor 702(3). The floors 702(1)-702(3) are serviced by a central unit 704 to provide antenna coverage areas 706 in the building infrastructure 700. The central unit 704 is communicatively coupled to a base station 708 to receive downlink communications signals 710D from the base station 708. The central unit 704 is communicatively coupled to a plurality of remote units 712 to distribute the downlink communications signals 710D to the remote units 712 and to receive uplink communications signals 710U from the remote units 712, as previously discussed above. The downlink communications signals 710D and the uplink communications signals 710U communicated between the central unit 704 and the remote units 712 are carried over a riser cable 714. The riser cable 714 may be routed through interconnect units (ICUs) 716(1)-716(3) dedicated to each of the floors 702(1)-702(3) that route the downlink communications signals 710D and the uplink communications signals 710U to the remote units 712 and also provide power to the remote units 712 via array cables 718.

Figure 8:
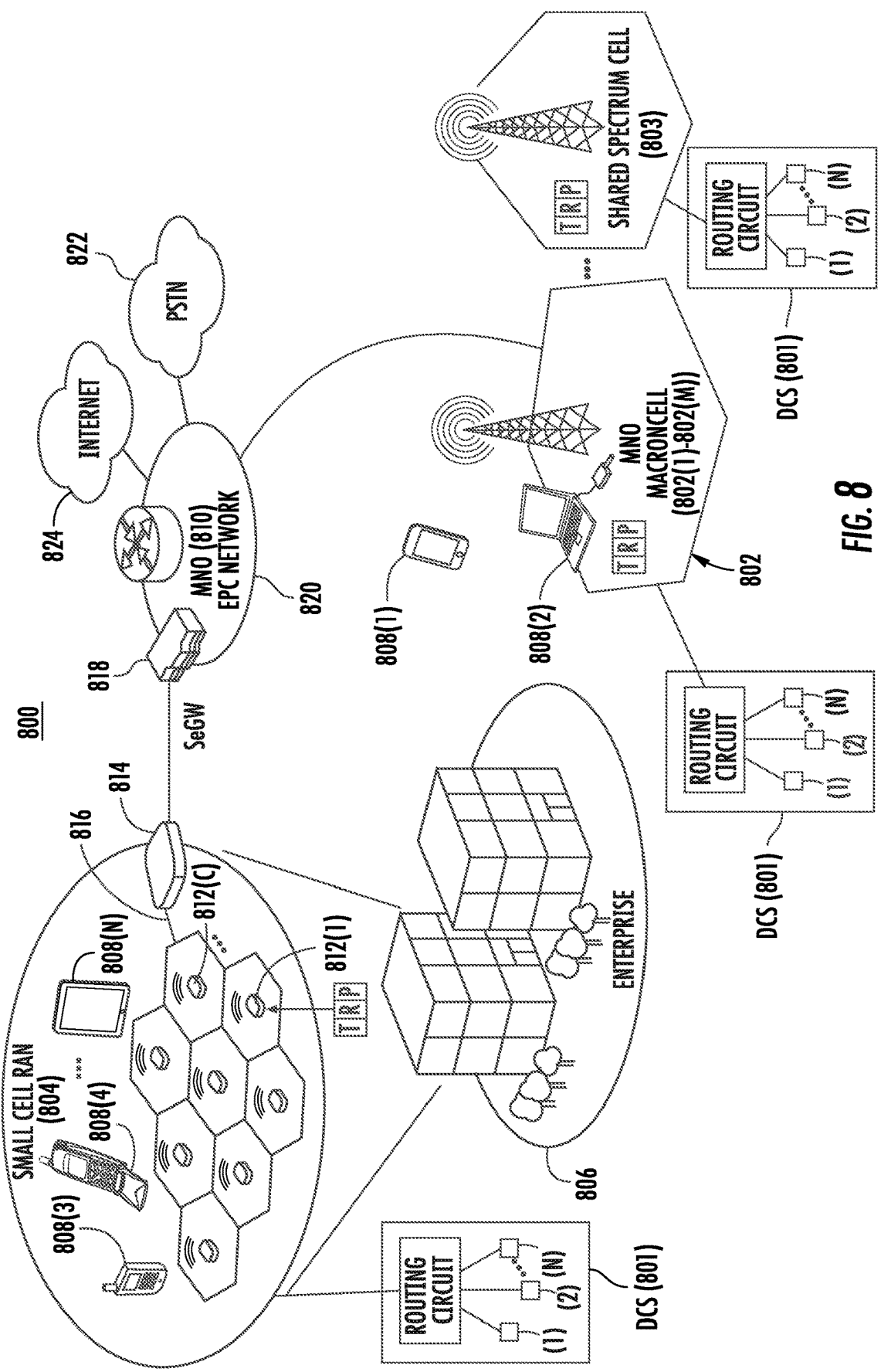
FIG. 8 is a schematic diagram of an exemplary mobile telecommunications environment that can includes the DCS of FIG. 3 and the WCS of FIG. 4A for supporting selective RF reference beam radiation based on UE locations.

The DCS 300 of FIG. 3 and the WCS 400 of FIG. 4A configured to support selective RF reference beam radiation based on UE locations can also be interfaced with different types of radio nodes of service providers and/or supporting service providers, including macrocell systems, small cell systems, and remote radio heads (RRH) systems, as examples. For example, FIG. 8 is a schematic diagram of an exemplary mobile telecommunications environment 800 (also referred to as "environment 800") that includes radio nodes and cells that may support shared spectrum, such as unlicensed spectrum, and can be interfaced to shared spectrum DCSs 801 supporting coordination of distribution of shared spectrum from multiple service providers to remote units to be distributed to subscriber devices. The shared spectrum DCSs 801 can include the DCS 300 of FIG. 3 and the WCS 400 of FIG. 4A, as an example.

The environment 800 includes exemplary macrocell RANs 802(1)-802(M) ("macrocells 802(1)-802(M)") and an exemplary small cell RAN 804 located within an enterprise environment 806 and configured to service mobile communications between a user mobile communications device 808(1)-808(N) to a mobile network operator (MNO) 810. A serving RAN for the user mobile communications devices 808(1)-808(N) is a RAN or cell in the RAN in which the user mobile communications devices 808(1)-808(N) have an established communications session with the exchange of mobile communications signals for mobile communications. Thus, a serving RAN may also be referred to herein as a serving cell. For example, the user mobile communications devices 808(3)-808(N) in FIG. 8 are being serviced by the small cell RAN 804, whereas the user mobile communications devices 808(1) and 808(2) are being serviced by the macrocell 802. The macrocell 802 is an MNO macrocell in this example. However, a shared spectrum RAN 803 (also referred to as "shared spectrum cell 803") includes a macrocell in this example and supports communications on frequencies that are not solely licensed to a particular MNO, such as CBRS for example, and thus may service user mobile communications devices 808(1)-808(N) independent of a particular MNO. For example, the shared spectrum cell 803 may be operated by a third party that is not an MNO and wherein the shared spectrum cell 803 supports CBRS. Also, as shown in FIG. 8, the MNO macrocell 802, the shared spectrum cell 803, and/or the small cell RAN 804 can interface with a shared spectrum DCS 801 supporting coordination of distribution of shared spectrum from multiple service providers to remote units to be distributed to subscriber devices. The MNO macrocell 802, the shared spectrum cell 803, and the small cell RAN 804 may be neighboring radio access systems to each other, meaning that some or all can be in proximity to each other such that a user mobile communications device 808(3)-808(N) may be able to be in communications range of two or more of the MNO macrocell 802, the shared spectrum cell 803, and the small cell RAN 804 depending on the location of the user mobile communications devices 808(3)-808(N).

In FIG. 8, the mobile telecommunications environment 800 in this example is arranged as an LTE system as described by the Third Generation Partnership Project (3GPP) as an evolution of the GSM/UMTS standards (Global System for Mobile communication/Universal Mobile Telecommunications System). It is emphasized, however, that the aspects described herein may also be applicable to other network types and protocols. The mobile telecommunications environment 800 includes the enterprise environment 806 in which the small cell RAN 804 is implemented. The small cell RAN 804 includes a plurality of small cell radio nodes 812(1)-812(C). Each small cell radio node 812(1)-812(C) has a radio coverage area (graphically depicted in the drawings as a hexagonal shape) that is commonly termed a "small cell." A small cell may also be referred to as a femtocell or, using terminology defined by 3GPP, as a Home Evolved Node B (HeNB). In the description that follows, the term "cell" typically means the combination of a radio node and its radio coverage area unless otherwise indicated.

In FIG. 8, the small cell RAN 804 includes one or more services nodes (represented as a single services node 814) that manage and control the small cell radio nodes 812(1)-812(C). In alternative implementations, the management and control functionality may be incorporated into a radio node, distributed among nodes, or implemented remotely (i.e., using infrastructure external to the small cell RAN 804). The small cell radio nodes 812(1)-812(C) are coupled to the services node 814 over a direct or local area network (LAN) connection 816 as an example, typically using secure IPsec tunnels. The small cell radio nodes 812(1)-812(C) can include multi-operator radio nodes. The services node 814 aggregates voice and data traffic from the small cell radio nodes 812(1)-812(C) and provides connectivity over an IPsec tunnel to a security gateway (SeGW) 818 in a network 820 (e.g, evolved packet core (EPC) network in a 4G network, or 5G Core in a 5G network) of the MNO 810. The network 820 is typically configured to communicate with a public switched telephone network (PSTN) 822 to carry circuit-switched traffic, as well as for communicating with an external packet-switched network such as the Internet 824.

The environment 800 also generally includes a node (e.g., eNodeB or gNodeB) base station, or "macrocell" 802. The radio coverage area of the macrocell 802 is typically much larger than that of a small cell where the extent of coverage often depends on the base station configuration and surrounding geography. Thus, a given user mobile communications device 808(3)-808(N) may achieve connectivity to the network 820 (e.g., EPC network in a 4G network, or 5G Core in a 5G network) through either a macrocell 802 or small cell radio node 812(1)-812(C) in the small cell RAN 804 in the environment 800.

Figure 9:
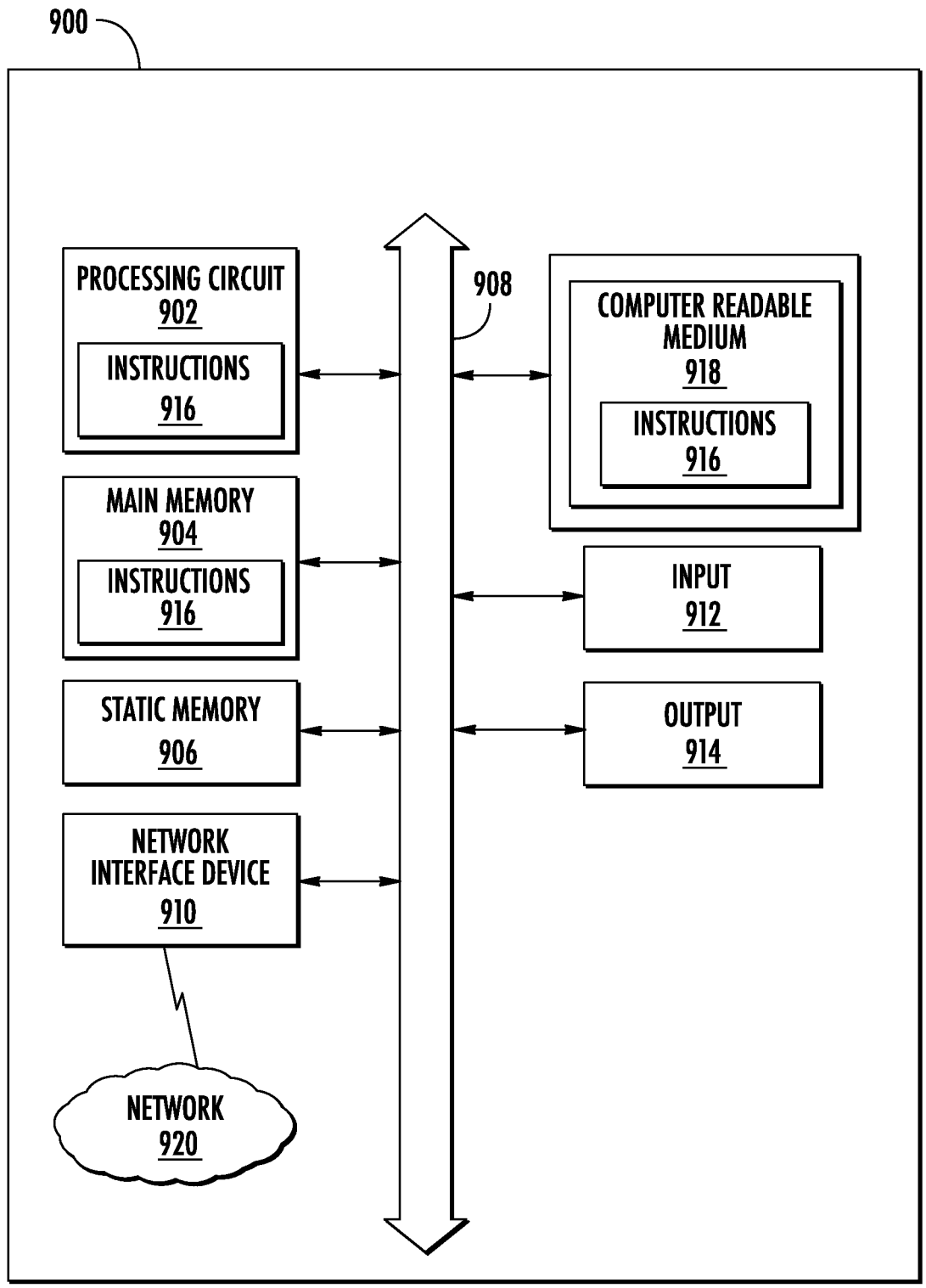
FIG. 9 is a schematic diagram of a representation of an exemplary computer system that can be included in or interfaced with any of the components in the DCS of FIG. 3 and the WCS in FIG. 4A for supporting selective RF reference beam radiation based on UE locations, wherein the exemplary computer system is configured to execute instructions from an exemplary computer-readable medium.

Any of the circuits in the DCS 300 of FIG. 3 and the WCS 400 of FIG. 4A, such as the control circuit 414 and/or the centralized service node 424, can include a computer system 900, such as that shown in FIG. 9, to carry out their functions and operations. With reference to FIG. 9, the computer system 900 includes a set of instructions for causing the multi-operator radio node component(s) to provide its designed functionality, and the circuits discussed above. The multi-operator radio node component(s) may be connected (e.g., networked) to other machines in a LAN, an intranet, an extranet, or the Internet. The multi-operator radio node component(s) may operate in a client-server network environment, or as a peer machine in a peer-to-peer (or distributed) network environment. While only a single device is illustrated, the term "device" shall also be taken to include any collection of devices that individually or jointly execute a set (or multiple sets) of instructions to perform any one or more of the methodologies discussed herein. The multi-operator radio node component(s) may be a circuit or circuits included in an electronic board card, such as a printed circuit board (PCB) as an example, a server, a personal computer, a desktop computer, a laptop computer, a personal digital assistant (PDA), a computing pad, a mobile device, or any other device, and may represent, for example, a server, edge computer, or a user's computer. The exemplary computer system 900 in this embodiment includes a processing circuit or processor 902, a main memory 904 (e.g., read-only memory (ROM), flash memory, dynamic random access memory (DRAM) such as synchronous DRAM (SDRAM), etc.), and a static memory 906 (e.g., flash memory, static random access memory (SRAM), etc.), which may communicate with each other via a data bus 908. Alternatively, the processing circuit 902 may be connected to the main memory 904 and/or static memory 906 directly or via some other connectivity means. The processing circuit 902 may be a controller, and the main memory 904 or static memory 906 may be any type of memory.

The processing circuit 902 represents one or more general-purpose processing circuits such as a microprocessor, central processing unit, or the like. More particularly, the processing circuit 902 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing circuit 902 is configured to execute processing logic in instructions 916 for performing the operations and steps discussed herein.

The computer system 900 may further include a network interface device 910. The computer system 900 also may or may not include an input 912 to receive input and selections to be communicated to the computer system 900 when executing instructions. The computer system 900 also may or may not include an output 914, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 900 may or may not include a data storage device that includes instructions 916 stored in a computer-readable medium 918. The instructions 916 may also reside, completely or at least partially, within the main memory 904 and/or within the processing circuit 902 during execution thereof by the computer system 900, the main memory 904 and the processing circuit 902 also constituting the computer-readable medium 918. The instructions 916 may further be transmitted or received over a network 920 via the network interface device 910.

While the computer-readable medium 918 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the processing circuit and that cause the processing circuit to perform any one or more of the methodologies of the embodiments disclosed herein. The term "computer-readable medium" shall accordingly be taken to include, but not be limited to, solid-state memories, optical and magnetic medium, and carrier wave signals.

Note that as an example, any "ports," "combiners," "splitters," and other "circuits" mentioned in this description may be implemented using Field Programmable Logic Array(s) (FPGA(s)) and/or a digital signal processor(s) (DSP(s)), and therefore, may be embedded within the FPGA or be performed by computational processes.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read only memory ("ROM"), random access memory ("RAM"), magnetic disk storage medium, optical storage medium, flash memory devices, etc.).

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

We claim:

1. A wireless communications system (WCS), comprising:
    a radio node coupled to an antenna array configured to radiate sequentially a plurality of radio frequency (RF) reference beams in a plurality of directions in a coverage area, wherein the radio node comprises a control circuit configured to:
        receive an indication signal comprising at least one location of at least one user equipment (UE) in the coverage area;
        determine one or more selected RF reference beams among the plurality of RF reference beams based on the at least one location of the at least one UE; and
        cause the antenna array to radiate sequentially the one or more selected RF reference beams; and
    a centralized service node coupled to an auxiliary radio node covering an auxiliary coverage area that overlaps with the coverage area of the radio node, the centralized service node is configured to:
        receive a location update from the auxiliary radio node;
        generate the indication signal comprising the at least one location if the location update indicates the at least one location of the at least one UE; and
        generate the indication signal not comprising the at least one location if the location update does not indicate the at least one location of the at least one UE.

2. The WCS of claim 1, wherein the radio node further comprises the antenna array.

3. The WCS of claim 1, wherein the control circuit is further configured to instruct the at least one UE to select a specific one of the one or more selected RF reference beams.

4. The WCS of claim 1, wherein the control circuit is further configured to cause the antenna array to radiate at least one of the one or more selected RF reference beams directly toward the at least one UE at the at least one location.

5. The WCS of claim 1, wherein the control circuit is further configured to cause the antenna array to radiate at least one of the one or more selected RF reference beams indirectly toward the at least one UE at the at least one location.

6. The WCS of claim 1, wherein:
the coverage area is divided into a plurality of coverage sectors each associated with a respective one or more of the plurality of RF reference beams; and
the control circuit is further configured to:
map the at least one location to at least one selected coverage sector among the plurality of coverage sectors; and
determine the one or more selected RF reference beams to be the respective one or more of the plurality of RF reference beams associated with the at least one selected coverage sector.

7. The WCS of claim 6, wherein the control circuit is further configured to cause the antenna array not to radiate any of the plurality of RF reference beams not associated with the at least one selected coverage sector.

8. The WCS of claim 6, wherein the control circuit is further configured to:
receive the indication signal not comprising the at least one location of the at least one UE; and
cause the antenna array not to radiate any of the plurality of RF reference beams in any of the plurality of coverage sectors in response to receiving the indication signal not comprising the at least one location of the at least one UE.

9. The WCS of claim 6, wherein the control circuit is further configured to cause the antenna array to radiate sequentially the plurality of RF reference beams in all of the plurality of coverage sectors based on an extended interval.

10. The WCS of claim 9, wherein the control circuit is further configured to cause the antenna array to radiate sequentially the plurality of RF reference beams in wider beamwidth.

11. The WCS of claim 1, wherein the centralized service node is further configured to:
receive the location update further comprising a capability indication that indicates whether the at least one UE is capable of receiving any of the plurality of RF reference beams; and
generate the indication signal comprising the capability indication.

12. The WCS of claim 1, wherein:
the WCS is a third-generation partnership project (3GPP) fourth-generation (4G)/fifth-generation (5G) non-standalone (4G/5G NSA) system;
the radio node is a 5G base station (gNodeB); and
the auxiliary radio node is a 4G base station (eNodeB) collocated with a non-3GPP radio device selected from the group consisting of a Wi-Fi access point, a Bluetooth device, and a global positioning system (GPS) device.

13. A method for supporting selective radio frequency (RF) reference beam radiation in a wireless communications system (WCS), comprising:
receiving an indication signal comprising at least one location of at least one user equipment (UE) in a coverage area;
determining one or more selected radio frequency (RF) reference beams among a plurality of RF reference beams based on the at least one location of the at least one UE;
radiating sequentially the one or more selected RF reference beams;
dividing the coverage area into a plurality of coverage sectors each associated with a respective one or more of the plurality of RF reference beams;
mapping the at least one location to at least one selected coverage sector among the plurality of coverage sectors; and
determining the one or more selected RF reference beams to be the respective one or more of the plurality of RF reference beams associated with the at least one selected coverage sector; and
not radiating any of the plurality of RF reference beams not associated with the at least one selected coverage sector.

14. The method of claim 13, further comprising instructing the at least one UE to select a specific one of the one or more selected RF reference beams.

15. The method of claim 13, further comprising radiating at least one of the one or more selected RF reference beams directly toward the at least one UE at the at least one location.

16. The method of claim 13, further comprising radiating at least one of the one or more selected RF reference beams indirectly toward the at least one UE at the at least one location.

17. The method of claim 13, further comprising:
receiving the indication signal not comprising the at least one location of the at least one UE; and
not radiating any of the plurality of RF reference beams in any of the plurality of coverage sectors in response to receiving the indication signal not comprising the at least one location of the at least one UE.

18. The method of claim 13, further comprising radiating sequentially the plurality of RF reference beams based on an extended interval.

19. The method of claim 13, further comprising radiating sequentially the plurality of RF reference beams in wider beamwidth.

* * * * *